(No Model.)

O. BRECKENRIDGE.
CHURN ATTACHMENT.

No. 321,678. Patented July 7, 1885.

WITNESSES:

INVENTOR
Orlo Breckenridge
BY Henry A. Chapin
ATTORNEY

UNITED STATES PATENT OFFICE.

ORLO BRECKENRIDGE, OF WESTFIELD, MASSACHUSETTS.

CHURN ATTACHMENT.

SPECIFICATION forming part of Letters Patent No. 321,678, dated July 7, 1885.

Application filed February 24, 1885. (No model.)

*To all whom it may concern:*

Be it known that I, ORLO BRECKENRIDGE, a citizen of the United States, residing at Westfield, in the county of Hampden and State of Massachusetts, have invented new and useful Improvements in Churning Attachments, of which the following is a specification.

This invention relates to improvements in churn attachments, the object being to provide for use with ordinary stone jars or other similar vessels, used as receptacles for cream or milk, churning attachments adapted to be applied directly to such receptacles, and capable of being adjusted to various sizes thereof.

Figure 1:
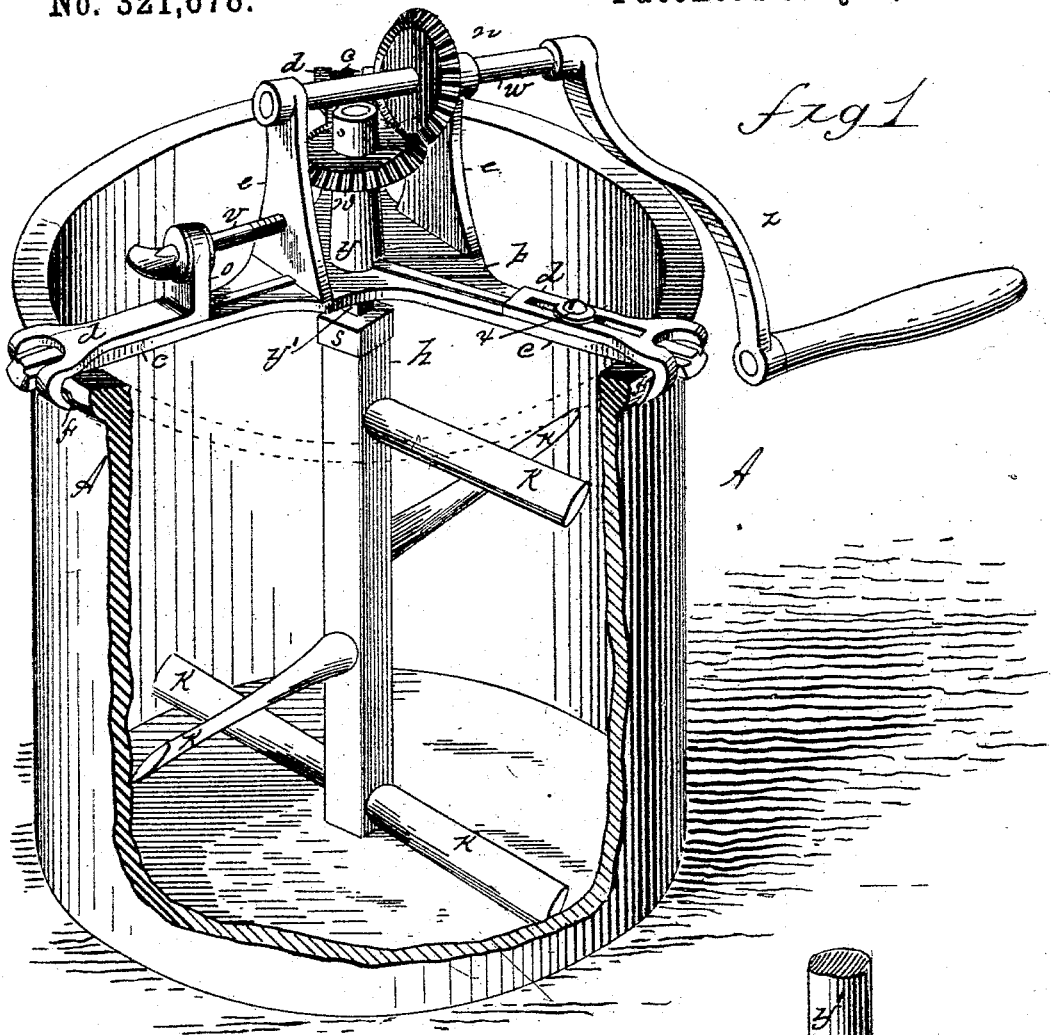
Figure 2:
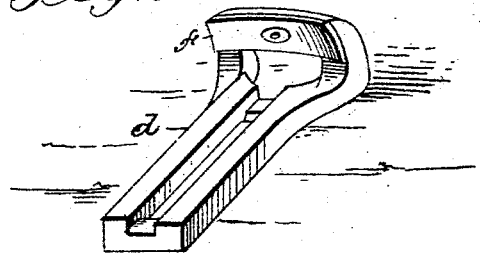
Figure 3:
Figure 4:
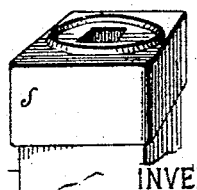

In the drawings forming part of this specification, Figure 1 is a perspective view of a cream-jar having applied thereto churning devices constructed according to my invention. Figs. 2, 3, and 4 are detail parts.

In the drawings, A illustrates an ordinary straight-sided stone jar. $b$ is a frame of iron or other suitable material, having two vertical standards, $e\ e$, thereon, and three arms, $c$, extending at right angles to said standards. A tubular shaft-support, $y$, stands up between the standards $e$ on frame $b$. A short shaft, $y'$, passes through the support $y$, and has a bevel-gear, $h'$, secured to its end above the latter. The lower end of the shaft $y'$ projects somewhat below the frame $b$, and is of square form, as shown in Fig. 3. A shaft, $w$, is hung in suitable bearings in the standards $e$, on which is fixed a bevel-gear, $n$, engaging with gear $n'$ on shaft $y'$. A crank, $z$, attached to shaft $w$ or other suitable means, is employed to rotate shaft $w$, and, through said gears $n\ n'$, the shaft $y'$.

Each of the arms $c$ is provided with a sliding hook, $d$, adjustable thereon to adapt the frame $b$ to be attached to vessels of different sizes. Two of said hooks, $d$, are secured to the arms $c$ by a screw, $x$, passing through a slot in the shank of the hook and entering the arm. The third sliding hook is connected with one of the standards $e$ by a thumb-screw, $v$, as shown, whereby said third hook is engaged with and disengaged from the rim of the jar A without the aid of a screw-driver, the latter only being required when the hooks are all to be adjusted. When the frame is required for only one-sized jar, only the said thumb-screw requires to be turned to attach the frame to the jar. Each hook $d$ has attached to that part thereof which comes directly in contact with the outer surface of the jar-rim a piece of rubber, $f$, to afford each hook a cushioned contact with the jar, whereby liability of breaking the latter by operating screw $v$ too forcibly is avoided and the frame is less likely to turn on the jar. Fig. 2 is a perspective view of one of the hooks $d$.

A churning wheel or frame is provided, to act in conjunction with the shaft $y'$ and its rotating devices, consisting of a square shaft, $h$, having a cap, $s$, on one end, provided with a square central socket in it to receive the squared end of the shaft $y'$, as shown in Fig. 1. The said cap and the end of said shaft $h$ are shown in Figs. 3 and 4. Arms K are secured to the sides of the shaft $h$, having sides whose faces stand at an incline to the axis of the shaft. The lower end of the latter rests upon the bottom of the jar A, and is guided centrally in the latter by the contact of the ends of the arms K with the sides of the jar. If desired, said arms may have their ends screw-threaded which are attached to shaft $h$, whereby they may be made to extend more or less from the latter, and thus be made adjustable to different-sized jars relative to the inner sides thereof.

The operation of the above-described attachment will be easily understood without further description.

What I claim as my invention is—

The within-described churning attachment, consisting of the frame $b$, having the arms $c$, provided with the adjustable hooks $d$, the shaft $y'$, and means, substantially as described, for rotating the latter, combined with the shaft $h$, detachably connected with said shaft $y'$, and having the arms K thereon, substantially as set forth.

ORLO BRECKENRIDGE.

Witnesses:
 WM. H. CHAPIN,
 J. D. GARFIELD.